United States Patent
Sura et al.

(10) Patent No.: US 10,711,941 B1
(45) Date of Patent: Jul. 14, 2020

(54) DOVETAIL SLIDING MOUNT WITH MOVABLE CLAMP BAR

(71) Applicant: United States of America as represented by the Secretary of the Navy, San Diego, CA (US)

(72) Inventors: Daniel Alberto Sura, San Diego, CA (US); Michael Eugene Phillips, Poway, CA (US); Dale Wayne Peters, San Diego, CA (US)

(73) Assignee: United States of America as represented by Secretary of the Navy, Washington, DC (US)

( * ) Notice: Subject to any disclaimer, the term of this patent is extended or adjusted under 35 U.S.C. 154(b) by 0 days.

(21) Appl. No.: 16/389,162

(22) Filed: Apr. 19, 2019

(51) Int. Cl.
  *F16B 5/06* (2006.01)
  *F16M 13/02* (2006.01)
  *F16M 11/22* (2006.01)

(52) U.S. Cl.
  CPC ............ *F16M 13/02* (2013.01); *F16B 5/06* (2013.01); *F16M 11/22* (2013.01); *F16M 2200/08* (2013.01)

(58) Field of Classification Search
  CPC ..... B62K 2206/00; F16B 5/06; F41G 11/003; F16M 11/041
  See application file for complete search history.

(56) References Cited

U.S. PATENT DOCUMENTS

| | | | | |
|---|---|---|---|---|
| 3,429,543 A | * | 2/1969 | Mooney | F16M 11/041 248/346.04 |
| 4,929,973 A | * | 5/1990 | Nakatani | F16M 11/041 248/177.1 |
| 5,333,023 A | * | 7/1994 | Oxford | F16M 11/041 248/222.13 |
| 9,052,574 B1 | * | 6/2015 | Johnson, Sr. | F16M 11/105 |
| 9,097,490 B2 | * | 8/2015 | Tseng | F41C 23/12 |
| 9,121,544 B2 | * | 9/2015 | DiCarlo | F16M 13/02 |
| 9,249,923 B2 | * | 2/2016 | DiCarlo | F16M 13/02 |
| 10,047,906 B2 | * | 8/2018 | Shimonishi | H01F 7/0263 |

(Continued)

OTHER PUBLICATIONS

McLeod, Wayne; Custom Spotting Scope stands for shooters; Kentucky Slider Quick Disconnect Spotting Scope Mount; Available from Gearbuggy.com and viewable at: http://gearbuggy.com/qd-spotting-scope-mount/, viewed Apr. 2019.

*Primary Examiner* — Bradley Duckworth
(74) *Attorney, Agent, or Firm* — Naval Information Warfare Center, Pacific; Kyle Eppele; J. Eric Anderson

(57) ABSTRACT

A sliding mount comprising: a base having a female dovetail groove therein, wherein the female dovetail groove has an open end and a closed end; a mounting cassette having a male dovetail feature configured to slidably interface with the base by insertion through the open end; a clamp bar having proximal and distal ends, wherein the proximal end is movably connected to the base such that when the clamp bar is in an open configuration, the clamp bar is sufficiently moved away from the open end to allow the mounting cassette to move in and out of the female dovetail groove; and a clasp having a first half disposed on the base and a second half disposed on the distal end of the clamp bar such that when the clamp bar is in a closed configuration, the clamp bar spans the open end and the first half is clasped to the second half so as to bias the mounting cassette against the closed end.

20 Claims, 7 Drawing Sheets

(56) References Cited

U.S. PATENT DOCUMENTS

| | | | |
|---|---|---|---|
| 10,194,544 B2* | 1/2019 | Wengreen | H05K 5/0204 |
| 10,299,528 B2* | 5/2019 | Dextraze | A42B 3/04 |
| 10,317,173 B2* | 6/2019 | DiCarlo | F41G 11/003 |

* cited by examiner

Closed Configuration

Open Configuration

DOVETAIL SLIDING MOUNT WITH MOVABLE CLAMP BAR

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, Calif., 92152; voice (619) 553-5118; ssc_pac_t2@navy.mil. Reference Navy Case Number 110083.

BACKGROUND OF THE INVENTION

There are many applications that require securely mounting equipment in a given orientation for a protracted period of time. For example, it is known to mount a thermal imager and a visual imager together on a pan and tilt unit that are meant to stay in place for many months. Often this equipment is mounted with fixed plates requiring fasteners and several tools—including socket wrenches, open ended wrenches, and allen key wrenches—to maintain/service. The installation and removal of this camera equipment is especially difficult in locations where the equipment is located on high towers requiring personnel to climb to great heights with tools and often work overhead in strenuous body positions. There is a need for an improved equipment-mounting apparatus.

SUMMARY

Disclosed herein is a sliding mount that comprises a base, a mounting cassette, a clamp bar, and a clasp. There is a female dovetail groove in the base that has an open end and a closed end. The mounting cassette has a male dovetail feature that is configured to slidably interface with the base by insertion through the open end. The clamp bar has proximal and distal ends. The proximal end is movably connected to the base. The clasp has a first half disposed on the base and a second half disposed on the distal end of the clamp bar. The sliding mount has an open configuration in which the clamp bar is sufficiently moved away from the open end to allow the mounting cassette to move in and out of the female dovetail groove. The sliding mount also has a closed configuration in which the clamp bar spans the open end and the first half is clasped to the second half so as to bias the mounting cassette against the closed end.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed apparatus below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1A:
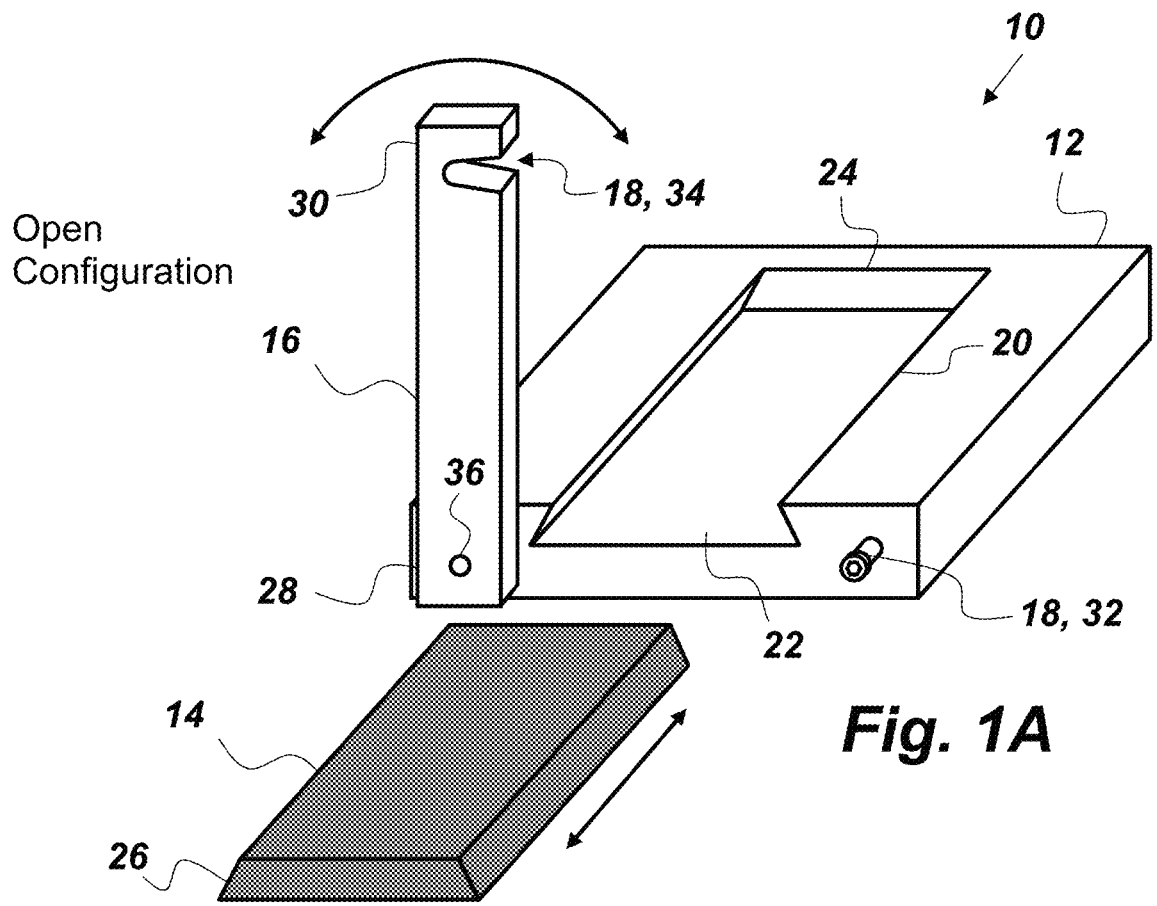
FIGS. 1A and 1B are perspective-view illustrations of an embodiment of a sliding mount in open and closed configurations respectively.
Figure 1B:
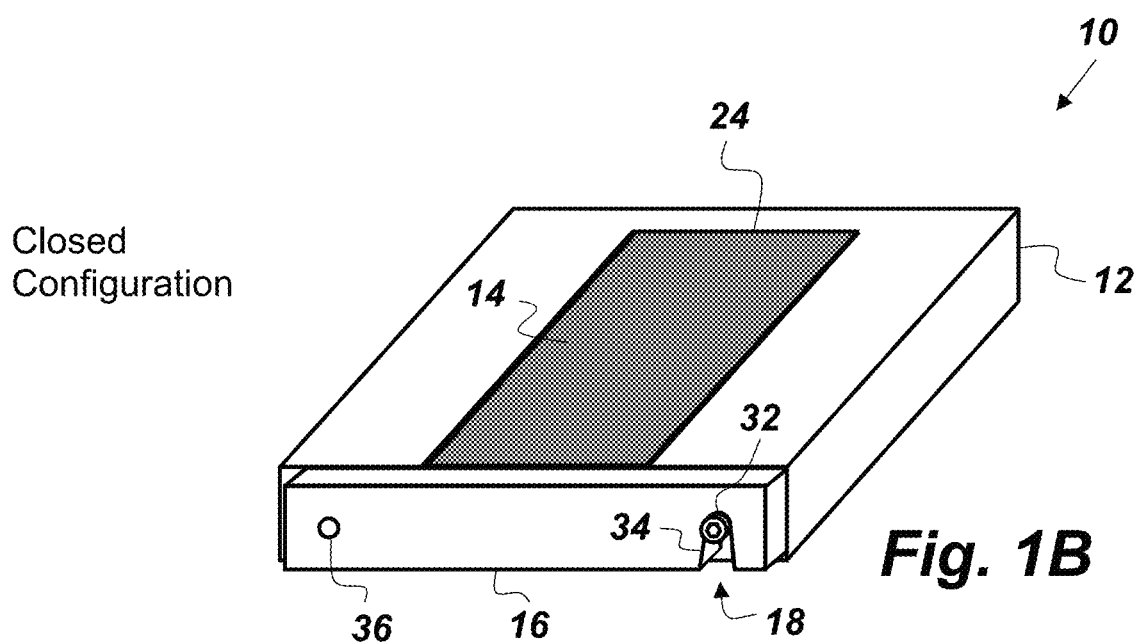

FIGS. 1A and 1B are perspective-view illustrations of an embodiment of a sliding mount 10 that comprises, consists of, or consists essentially of a base 12, a mounting cassette 14, a clamp bar 16, and a clasp 18. There is a female dovetail groove 20 in the base 12 that has an open end 22 and a closed end 24. The mounting cassette 14 has a male dovetail feature 26 that is configured to slidably interface with the base 12 by insertion through the open end 22. The clamp bar 16 has proximal and distal ends 28 and 30 respectively. The proximal end 28 is movably connected to the base 12. The clasp 18 has a first half 32 disposed on the base 12 and a second half 34 disposed on the distal end 30 of the clamp bar 16. The sliding mount 10 has an open configuration (shown in FIG. 1A) in which the clamp bar 16 is sufficiently moved away from the open end 22 to allow the mounting cassette 14 to move in and out of the female dovetail groove 20. The sliding mount 10 also has a closed configuration (shown in FIG. 1B) in which the clamp bar 16 spans the open end 22 and the first half 32 is clasped to the second half 34 so as to bias the mounting cassette 14 against the closed end 24. The embodiment of the sliding mount 10 depicted in FIGS. 1A and 1B further comprises a pin 36 that is connected to the base 10 near the open end 22. The pin 36 is disposed in a hole in the proximal end 28 of the clamp bar 16 such that the clamp bar 16 moves around the pin 36.

The base 12 may be made of any material strong enough to rigidly support the mounting cassette 14. The clamp bar 16 may be made of the same or different material as the base 12. Two suitable examples of material from which the base 12 and the clamp bar 16 may be made include, but are not limited to, anodized aluminum and stainless steel. The mounting cassette 14 may be made of any material that allows the mounting cassette 14 to slidably interface with the base 12. For example, the mounting cassette 14 may be made of plastic such as Polyoxymethylene. In one embodiment, the mounting cassette 14 is made of a material that has a coefficient of friction that is less-than or equal to 0.20. In one embodiment, the mounting cassette 14 is made of a material that is softer than the base 12 so as to reduce the likelihood that the mounting cassette 14 scratches or gouges the base 12 upon insertion and/or extraction. Accordingly, the base 12 may be designed out of harder/more durable materials than the mounting cassette 14 so as to have a longer service life than the mounting cassette 14.

Figure 2A:
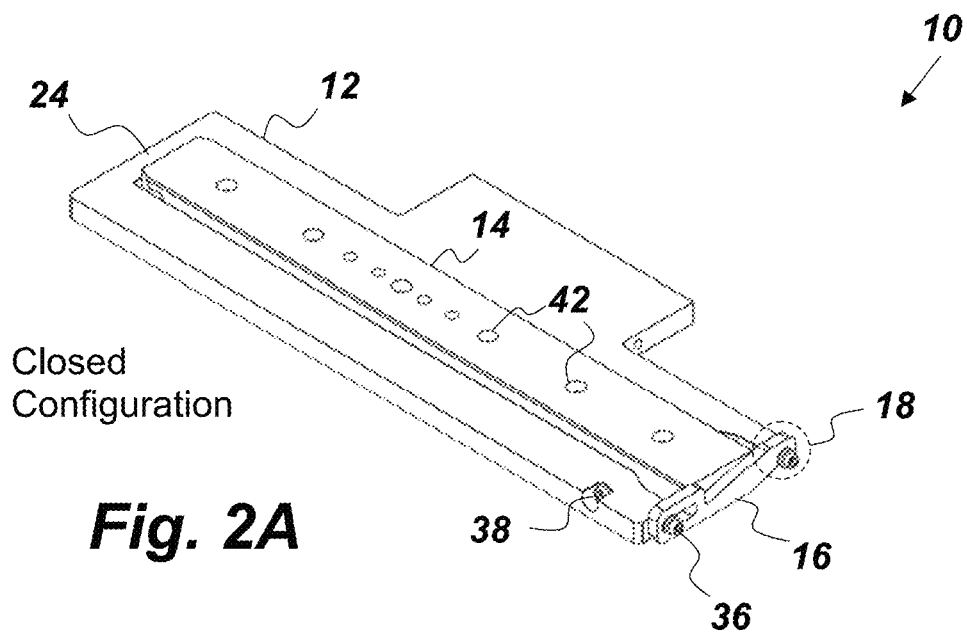
FIGS. 2A and 2B are perspective-view illustrations of an embodiment of a sliding mount in closed and open configurations respectively.
Figure 2B:
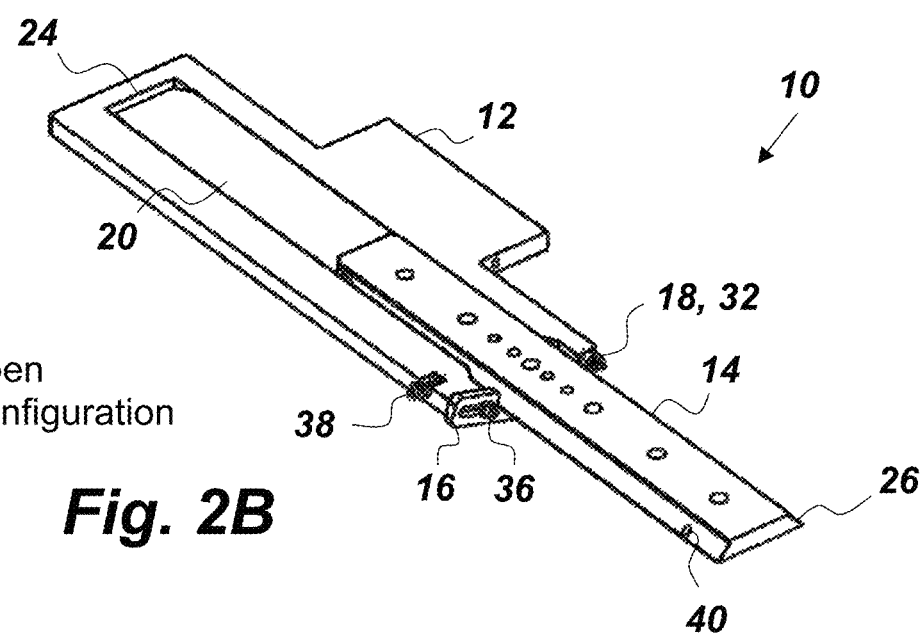

FIGS. 2A-5B depict different features of a slotted-clamp-bar embodiment of the sliding mount 10. FIGS. 2A and 2B are perspective views of the slotted-clamp-bar embodiment of the sliding mount 10 in closed and open configurations respectively. Also shown in FIGS. 2A and 2B is an optional safety bolt 38 fastened to a side of the base 12 such that when tightened, the safety bolt 38 is configured to enter the female dovetail groove 20 and to interface with a hole 40. The hole 40 is positioned in the mounting cassette 14 so as to align with the safety bolt 38 when the mounting cassette 14 is biased against the closed end 24, as shown in FIG. 2A. Also depicted in FIGS. 2A-5B is a series of mounting holes 42 in the mounting cassette 14 to accommodate a wide range of equipment that can be easily installed/removed/replaced.

Figure 6A:
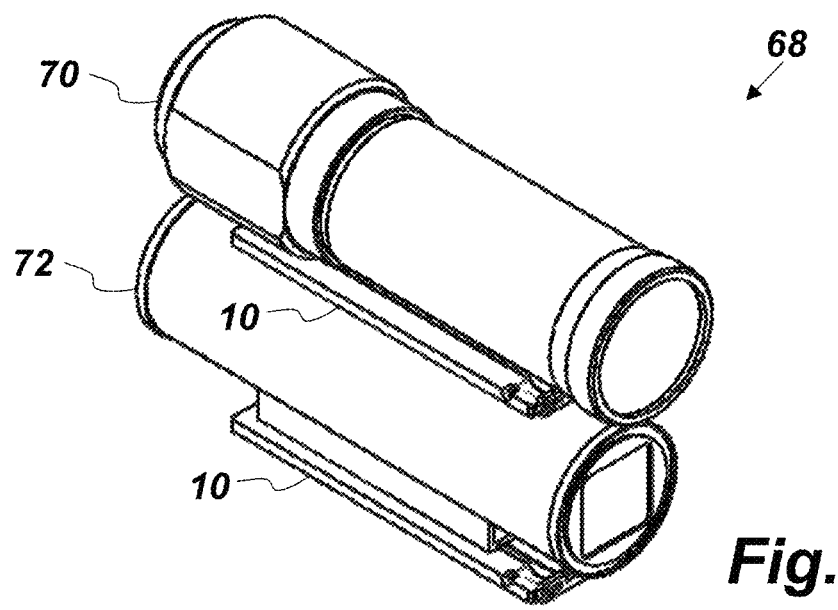
FIG. 6A is a perspective view of equipment mounted to an embodiment of a sliding mount.
Figure 6B:
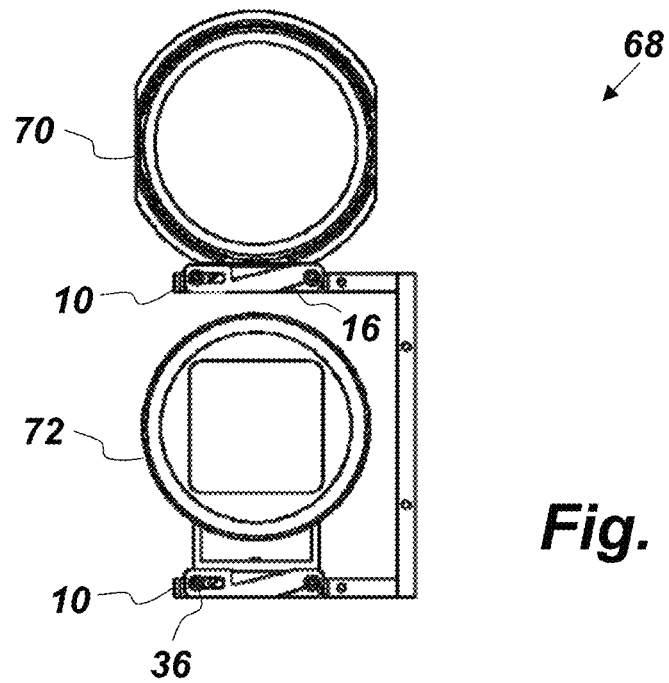
FIG. 6B is a front view of equipment mounted to an embodiment of a sliding mount.

In the slotted-clamp-bar embodiment of the sliding mount 10, the proximal end 28 of the clamp bar 16 comprises a slot 44 that allows both pivoting and transverse sliding of the clamp bar 16 with respect to the pin 36 and the base 12. This arrangement is advantageous in operational scenarios where there is limited space above and below the sliding mount 10 in which to work, such as is depicted in FIGS. 6A and 6B. All embodiments of the sliding mount 10 provide technicians and engineers with a quick and easy way to slide equipment (such as the first optical imager 70 depicted in FIGS. 6A and 6B) mounted on the mounting cassette 14 in and out of a base 12. The sliding mount 10 is capable of easily clamping and releasing the mounting cassette 14 using no more than a single tool. For example, with the slotted-clamp-bar embodiment of the sliding mount 10, only a single hex wrench would be required to transition between open and closed configurations.

Figure 3A:
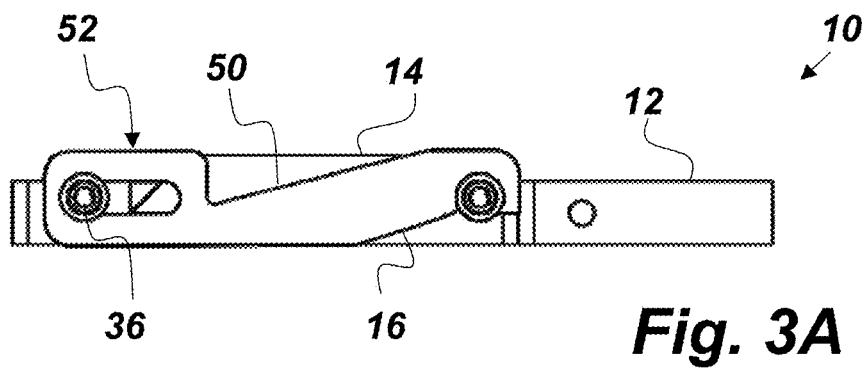
FIGS. 3A and 3B are front-view illustrations of an embodiment of the sliding mount in closed and open configurations respectively.
Figure 3B:
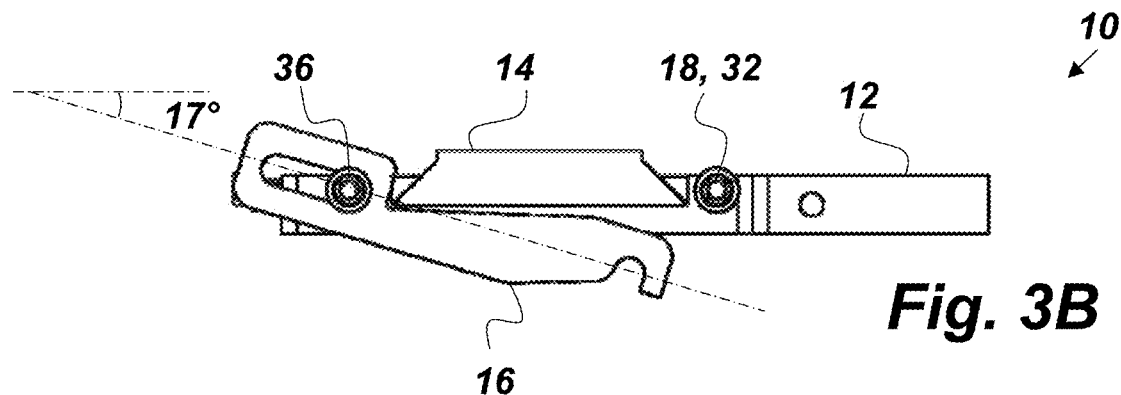

Still referring to the slotted-clamp-bar embodiment of the sliding mount 10, the second half 34 of the clasp 18 is a hook and forms part of the distal end 30 of the clamp bar 16. The first half 32 of the clasp 18 is a hook receiver, which in this embodiment is a clasp bolt screwed partly into the base 12 such that, when in the closed configuration, the clasp bolt may be tightened down on the distal end 30 of the clamp bar 16 thereby preventing the clamp bar 16 from unintentionally moving out of the closed configuration by clamping the distal end 30 between a head of the clasp bolt and the base 12. The pin 36 in this embodiment is also a bolt. The slot 44 is configured such that when the clamp bar 16 pivots around the pin 36 when the pin 36 is positioned in a first end 46 of the slot 44, the clasp second half 34 (e.g., hook in this embodiment) is aligned to engage the clasp first half 32 (e.g., hook receiver) such as is shown in FIG. 3A, and when the clamp bar 16 pivots around the pin 36 when the pin 36 is positioned in a second end 48 of the slot 44, the clasp second half 34 does not engage the clasp first half 32 such as is shown in FIG. 3B. In the slotted-bar-clamp embodiment, the clamp bar 16 and the base 12 are made of anodized aluminum and the mounting cassette is made of Polyoxymethylene. Also in this embodiment, the pin 36, the safety bolt 38, and the clasp bolt (i.e., the clasp first half 32) are made of stainless steel.

Figure 3C:
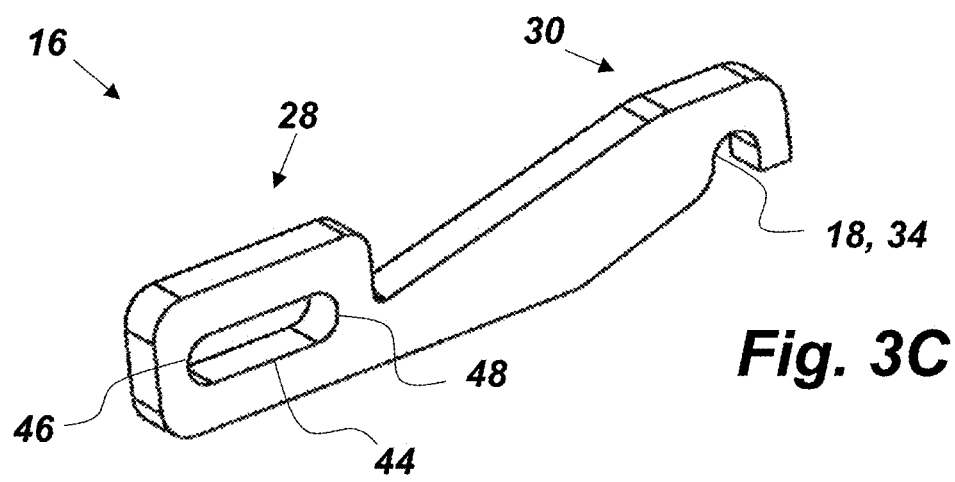
FIG. 3C is a perspective view of a clamp bar of an embodiment of a sliding mount.

FIGS. 3A and 3B are front-view illustrations of the slotted-clamp-bar embodiment of the sliding mount 10 in the closed and open configurations respectively. FIG. 3C is a perspective view illustration of the clamp bar 16 from the slotted-clamp-bar embodiment of the sliding mount 10, in which embodiment, the clamp bar 16 has a triangular-shaped notch 50 in a top surface 52 that allows the clamp bar 16 to move into the open configuration by pivoting no more than 20 degrees in either direction from the closed position. In reference to FIGS. 3A, 3B, and 3C, in order to transition from the closed configuration to the open configuration, a user may perform the following steps. First, the pin 36 and the clasp first half 32 are loosened until the user is able to pivot the clamp bar 16 around the pin 36 by hand. Next, the user pivots the clamp bar upwards about 5 degrees, away from the clasp bolt (i.e., the clasp first half 32) until the hook portion of the clamp bar 16 is free of the clasp bolt. Next, the user slides the clamp bar 16 such that the pin 36 moves from the first end 46 of the slot 44 to the second end 48 of the slot 44. In this position, the clamp bar 16 is free to pivot around the pin 36 without engaging the clasp first half 32. Next, the user pivots the clamp bar 16 downward until the mounting cassette 14 is free to slide out of the base 12, such as is depicted in FIG. 3B. Optionally, the user may then lightly tighten the pin 36, which in this embodiment is a bolt, to keep the clamp bar 16 out of the way of the mounting cassette 14 and/or from coming into contact with nearby equipment/structure. Note that due to the notch 50, the clamp bar 16 need only be pivoted downward about 17 degrees from a horizontal position before the mounting cassette 14 is free to slide out of the base 12. This is particularly advantageous in situations where there is limited working space such as when two pieces of equipment are mounted one on top of the other such as is depicted in FIGS. 6A and 6B. This arrangement is also advantageous in that the mass of sliding mount 10 is largely centered around a longitudinal center line 54 (shown in FIG. 6B) of the mounting cassette 14, which aids in balancing the equipment and reduces the likelihood of the sliding mount 10 snagging on clothing or other potential hazards as could occur with other embodiments that include side-mounted tightening/adjustment fasteners.

Figure 4A:
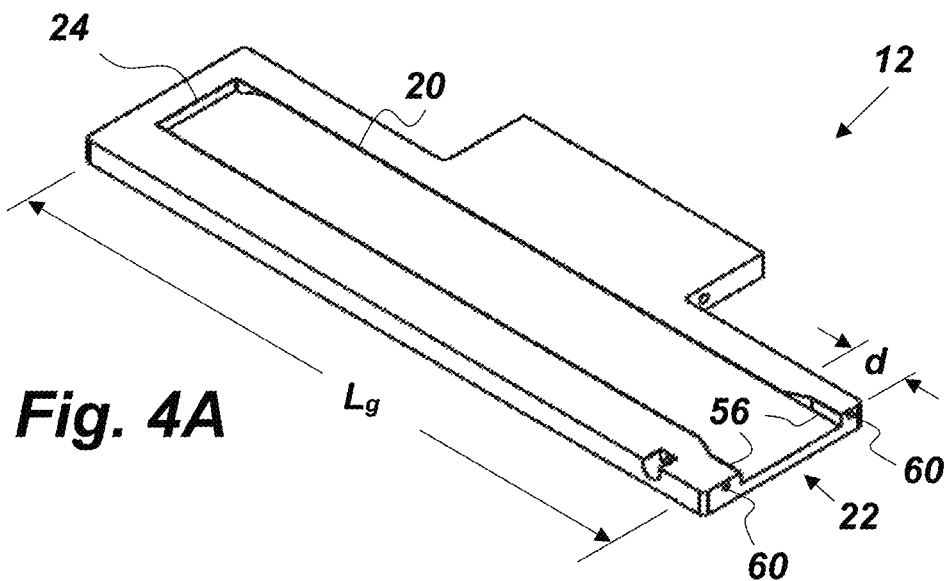
FIG. 4A is a perspective view of a base of an embodiment of a sliding mount.
Figure 4B:
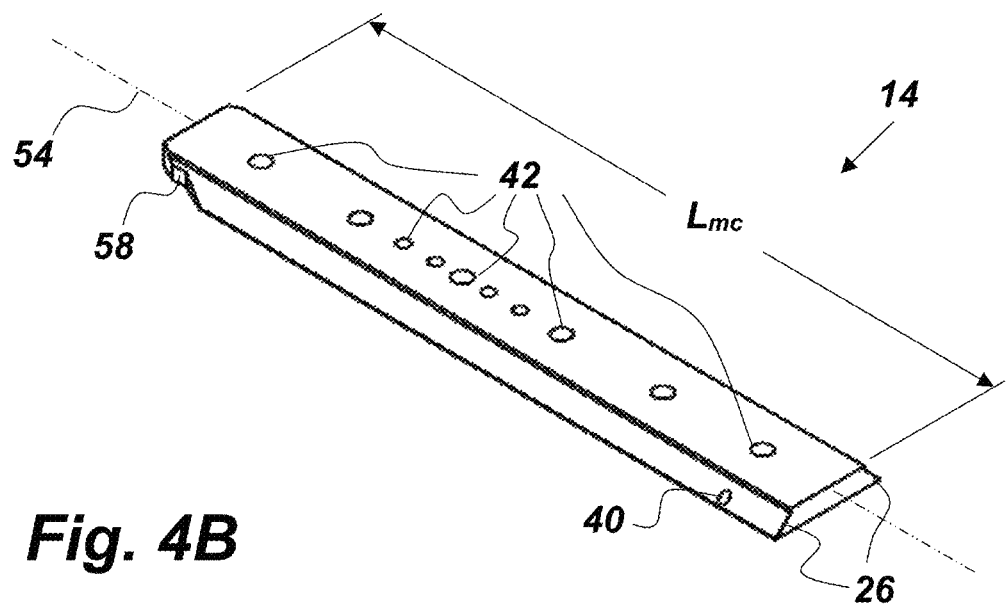
FIG. 4B is a perspective view of a mounting cassette of an embodiment of a sliding mount.

FIGS. 4A and 4B are perspective views of the base 12 and the mounting cassette 14 from the slotted-bar-clamp embodiment of the sliding mount 10. Notice that in this embodiment, the base 12 has optional guide-in features 56 disposed in the open end 22 and the mounting cassette has optional beveled edges 58 to facilitate insertion of the mounting cassette 14 into the base 12. This creates a self-aligning feature and a significant advantage especially in situations where the mounting cassette 14 needs to be removed/replaced over the maintainer's head and mechanical alignment for insertion becomes difficult to impossible and even dangerous. Also in this embodiment, the pin 36 and the clasp first half 32 are 8-32 bolts and the threaded holes 60 for receiving them are tapped to a distance d of at least 20 centimeters, which is approximately five times the diameter of an 8-32 bolt. The pin 36 and the clasp bolt (i.e., clasp first half 32) in this embodiment are each long enough such that when tightened against the clamp bar 16 about 20 centimeters of the pin 36 and the clasp bolt are threaded into the holes 60, which requires more than 20 complete revolutions of each bolt to completely extract it from the base 12. While this does increase cost in terms of deeper threaded holes and longer bolts than are strictly necessary, it provides the advantage that a user will be less likely to completely extract a bolt and potentially lose it when servicing equipment mounted to the sliding mount 10. Marine lubricant may be placed on the threads of the pin 36, the safety bolt 38, and the clasp bolt (i.e., the clasp first half 32) to prevent corrosion and/or seizing of the pin 36, the safety bolt 38, and the clasp bolt.

Figure 5A:
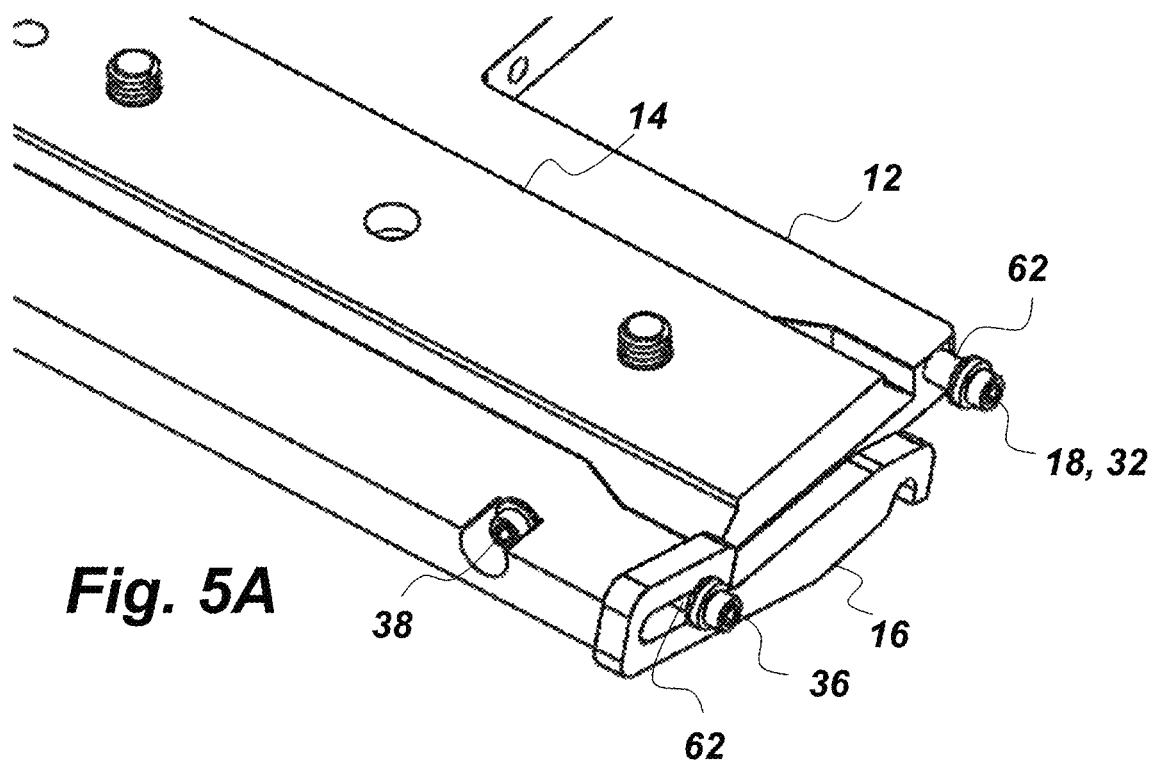
FIG. 5A is a partial, perspective view of an embodiment of a sliding mount.
Figure 5B:
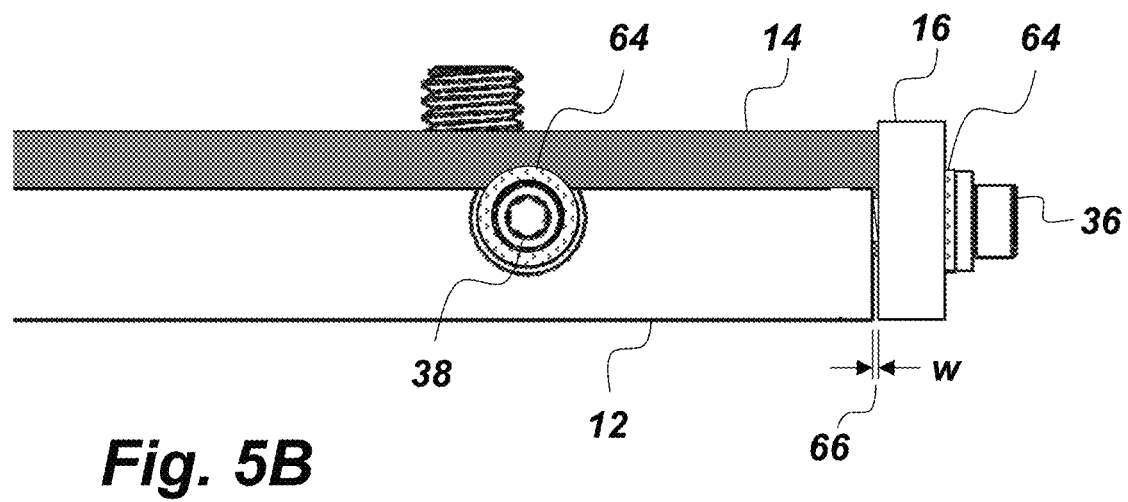
FIG. 5B is a partial, side view of an embodiment of a sliding mount.

FIGS. 5A and 5B are partial, perspective and side-views respectively of the slotted-bar-clamp embodiment of the sliding mount 10. As shown in FIG. 5A, the pin 36 and the clasp first half 32 may further comprise nylon sleeves 62 disposed around the pin 36 and threads of the clasp bolt such that the clamp bar 16 does not come into physical contact with the stainless steel of the pin 36 or the clasp bolt. In some embodiments, insulative washers 64 may also be used to prevent the heads of the pin 36 and the clasp bolt from coming into physical contact with the stainless steel of the pin 36 or the clasp bolt thereby preventing galvanic corrosion and enabling the sliding mount 10 to be used in corrosive outdoor environments such as marine environments. FIGS. 4A, 4B, and 5B show how the length $L_{mc}$ of the mounting cassette 14 is slightly longer than the length 4 of the female dovetail groove 20, resulting in a gap 66 between the clamping bar 16 and the base 12. For example, the width w of the gap 66 can be approximately 1 millimeter. Tightening the pin 36 and the clasp first half 32 in the closed configuration results in compression of the mounting cassette 14 between the clamp bar 16 and the closed end 24, which compression causes minor, elastic longitudinal plastic deformation of the mounting cassette 14 sufficient to immobilize the mounting cassette 14 in the base 12 when in the closed configuration. In some embodiments of the sliding mount 10, no transverse clamping or transverse compression is applied to the mounting cassette 14—only longitudinal clamping/compression.

FIGS. 6A and 6B are respectively perspective and front views of a dual optics system 68 utilizing two instances of an embodiment of the sliding mount 10. The dual optics system 68 comprises a first optical imager 70 mounted above a second optical imager 72. As can be seen in FIGS. 6A and 6B, there is insufficient room between the first and second optical imagers 70 and 72 for the clamp bar 16 to rotate completely around the pin 36. The unique geometry of the clamp bar 16 in this embodiment of the sliding mount 10 enable the clamp bar 16 to be moved into the open configuration even in movement-limited locations such as is depicted in FIGS. 6A and 6B.

Figure 7A:
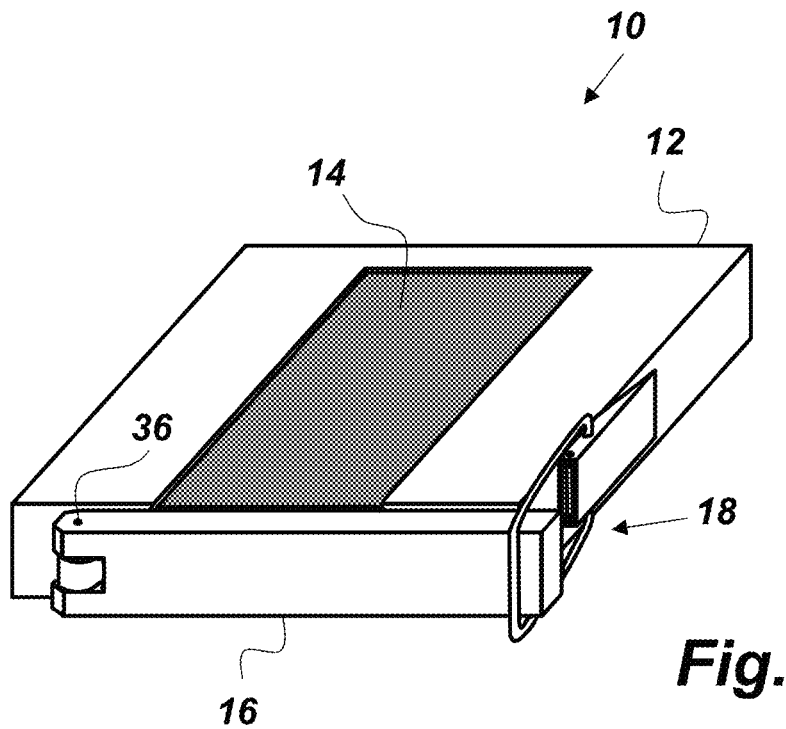
FIGS. 7A and 7B show perspective views of different embodiments of a sliding mount.
Figure 7B:
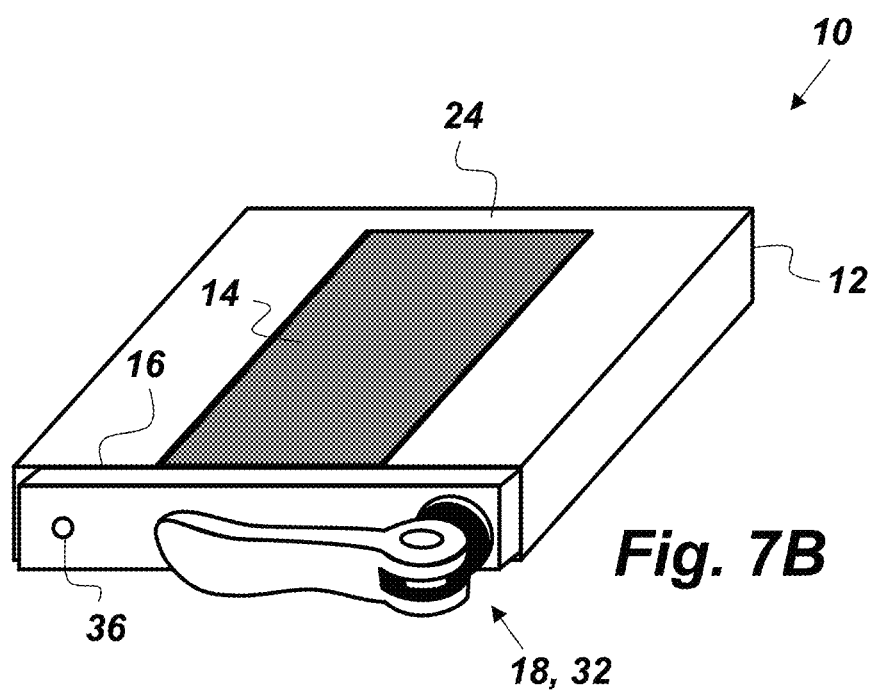

FIGS. 7A and 7B show perspective views of different embodiments of the sliding mount 10. In the embodiment of the sliding mount 10 shown in FIG. 7A, the pin 36 serves as a hinge pin that enables the clamp bar 16 to move parallel to the longitudinal plane of the female dovetail groove 20, and the clasp 18 is a hand-operated toggle latch. In the embodiment of the sliding mount 10 shown in FIG. 7B the clasp first half 32 is a cam-lock bolt.

From the above description of the sliding mount 10, it is manifest that various techniques may be used for implementing the concepts of sliding mount 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that sliding mount 10 is not limited to the particular embodiments described herein, but is capable of many embodiments without departing from the scope of the claims.

We claim:

1. A sliding mount comprising:
   a base having a female dovetail groove therein, wherein the female dovetail groove has an open end and a closed end;
   a mounting cassette having a male dovetail feature configured to slidably interface with the base by insertion through the open end;
   a clamp bar having proximal and distal ends, wherein the proximal end is movably connected to the base such that when the clamp bar is in an open configuration, the clamp bar is sufficiently moved away from the open end to allow the mounting cassette to move in and out of the female dovetail groove; and
   a clasp having a first half disposed on the base and a second half disposed on the distal end of the clamp bar such that when the clamp bar is in a closed configuration, the clamp bar spans the open end and the first half is clasped to the second half so as to bias the mounting cassette against the closed end.

2. The sliding mount of claim 1, further comprising a pin connected to the base near the open end and disposed in a hole in the proximal end of the clamp bar such that the clamp bar moves around the pin.

3. The sliding mount of claim 2, wherein the hole in the proximal end of the clamp bar is a slot that allows both pivoting and transverse sliding of the clamp bar with respect to the pin.

4. The sliding mount of claim 3, wherein the second half of the clasp is a hook and the first half of the clasp is a hook receiver, and wherein the slot is configured such that when the clamp bar pivots around the pin when the pin is positioned in a first end of the slot, the hook is aligned to engage the hook receiver and when the clamp bar pivots around the pin when the pin is positioned in a second end of the slot, the hook does not engage the hook receiver.

5. The sliding mount of claim 4, wherein the distal end of the clamp bar itself is hook-shaped and serves as the second half of the clasp, wherein the hook receiver is a first bolt fastened to the base so as to receive the hook when the clamp bar is in the closed position; and wherein the first bolt may be tightened when the clamp bar is in the closed configuration such that the distal end is clamped between the base and a head of the first bolt.

6. The sliding mount of claim 5, wherein the base and the clamp bar are made of the same material.

7. The sliding mount of claim 6, further comprising nylon sleeves disposed around the pin and threads of the first bolt such that the clamp bar does not come into physical contact with the pin or the first bolt.

8. The sliding mount of claim 1, wherein the clamp bar has a mass that, when in the closed configuration, is approximately balanced over a longitudinal center line of the mounting cassette.

9. The sliding mount of claim 4, wherein the clamp bar has a triangular-shaped notch in a top surface that allows the clamp bar to move into the open configuration by pivoting no more than 25 degrees in either direction from the closed position.

10. The sliding mount of claim 7, wherein the open end of the female dovetail groove and a back end of the mounting cassette comprise beveled edges configured to facilitate insertion of the mounting cassette into the female dovetail groove.

11. The sliding mount of claim 10, further comprising a safety bolt fastened to a side of the base such that when tightened, the safety bolt is configured to enter the female dovetail groove and to interface with a hole positioned in the mounting cassette so as to align with the safety bolt when the mounting cassette is biased against the closed end.

12. The sliding mount of claim 5, wherein the first bolt is a cam-lock bolt.

13. The sliding mount of claim 10, wherein the pin is part of a pin bolt, and wherein the pin bolt and the first bolt are threaded into the base in the closed configuration to a distance that is at least five times the diameter of the pin bolt and the first bolt respectively.

14. The sliding mount of claim 1, wherein no transverse clamping is applied to the mounting cassette.

15. The sliding mount of claim 1, wherein the base is made of metal and the mounting cassette is made of plastic.

16. The sliding mount of claim 15, wherein the mounting cassette is made of a material that has a coefficient of friction that is less-than or equal to 0.20.

17. The sliding mount of claim 1, wherein the clamp bar is configured such that placing the clamp bar in the closed configuration results in minor, longitudinal plastic deformation of the mounting cassette.

18. The sliding mount of claim 2, wherein the pin serves as a hinge pin that enables the clamp bar to move parallel to the longitudinal plane of the female dovetail groove.

19. The sliding mount of claim 18, wherein the clasp is a hand-operated toggle latch.

20. The sliding mount of claim 13, wherein threads of the pin bolt and the first bolt are coated in marine lubricant.

* * * * *